United States Patent
Kim et al.

(10) Patent No.: US 11,372,766 B2
(45) Date of Patent: Jun. 28, 2022

(54) MEMORY SYSTEM, MEMORY CONTROLLER, AND METHOD OF OPERATING MEMORY SYSTEM

(71) Applicant: SK hynix Inc., Icheon-si (KR)

(72) Inventors: Do Hun Kim, Icheon-si (KR); Ju Hyun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/175,645

(22) Filed: Feb. 13, 2021

(65) Prior Publication Data

US 2022/0058129 A1 Feb. 24, 2022

(30) Foreign Application Priority Data

Aug. 24, 2020 (KR) .................. 10-2020-0106077

(51) Int. Cl.
*G06F 12/08* (2016.01)
*G06F 12/0873* (2016.01)
*G06F 12/0891* (2016.01)
*G06F 11/34* (2006.01)
*G06F 11/30* (2006.01)
*G06F 12/1045* (2016.01)

(52) U.S. Cl.
CPC ...... *G06F 12/0873* (2013.01); *G06F 11/3037* (2013.01); *G06F 11/3409* (2013.01); *G06F 12/0891* (2013.01); *G06F 12/1063* (2013.01)

(58) Field of Classification Search
None
See application file for complete search history.

(56) References Cited

U.S. PATENT DOCUMENTS

| 10,599,570 B1* | 3/2020 | Ding ................. G06F 16/29 |
| 2002/0108017 A1* | 8/2002 | Kenchammana-Hoskote ............. G06F 12/0804 711/E12.04 |
| 2020/0050516 A1* | 2/2020 | Alsalim ............. G06F 16/128 |

FOREIGN PATENT DOCUMENTS

KR 10-2007-0061120 A 6/2007
KR 10-2017-0108714 A 9/2017

* cited by examiner

*Primary Examiner* — Tracy C Chan
(74) *Attorney, Agent, or Firm* — Perkins Coie LLP

(57) ABSTRACT

Disclosed are a memory system, a memory controller, and a method of operating the memory system. The memory system may configure a plurality of map cache pools for caching map data of different types, respectively, within a map cache in which the map data is cached, configure a timer in a first map cache pool among the plurality of map cache pools, and write map data cached in the first map cache pool in the memory device based on the timer.

19 Claims, 13 Drawing Sheets

FIG.8

| type | size | number of writes when update is performed | write size when update is performed |
|---|---|---|---|
| L2V | 4B | 1 | 4B |
| VPT | 4B | 2 | 8B |
| Journal | 12B | 1 | 12B |

FIG.9 target performance = 1M IOPS, number of stripes = 64

| type | write size when update is performed | cache line | dirty rate | number of cache lines to be flushed | timer(us) |
|---|---|---|---|---|---|
| L2V | 4B | 64B | 1/16 | 64/16 = 4 | 1/4 |
| VPT | 8B | 64B | 1/8 | 64/8 = 8 | 1/8 |
| Journal | 12B | 128B | 3/32 | (64*3)/32 = 6 | 1/6 |

MEMORY SYSTEM, MEMORY CONTROLLER, AND METHOD OF OPERATING MEMORY SYSTEM

CROSS REFERENCE TO RELATED APPLICATION

This patent document claims the priority and benefits of Korean patent application number 10-2020-0106077 filed on Aug. 24, 2020, which is incorporated herein by reference in its entirety.

TECHNICAL FIELD

Embodiments of the disclosed technology relate to a memory system, a memory controller, and a method of operating the memory system.

BACKGROUND

A memory system can include a storage device to store data. Such a memory system can operate on the basis of a request from a host, such as computers, mobile devices (for example, a smartphone or a tablet), or other similar electronic devices. The examples of the memory system may span from a traditional hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and execute the command or control read/write/erase operations on the memory devices included in the memory system. The memory controller may also be used to run firmware for performing a logical operation for controlling such operations.

In the conventional art, a memory system manages map data for performing operations of reading, writing, and erasing data in a memory device. The memory system uses a map cache for caching map data in order to rapidly access map data. After updating the map data cached in the map cache, the memory system flushes the map data cached in the map cache in the memory device when a specific condition is satisfied.

SUMMARY

Embodiments of the disclosed technology may provide a memory system, a memory controller, and a method of operating the memory system capable of mitigating deterioration of the performance of a read operation and a write operation, which is caused due to intensive flushing of map data in a memory device.

Some embodiments of the disclosed technology may provide a memory system, a memory controller, and a method of operating the memory system capable of satisfying QoS of a read operation and a write operation that are requested by a host.

In accordance with an aspect, a memory system is provided to include a memory device operable to store data and a memory controller in communication with the memory device and configured to control the memory device. The memory controller may configure a plurality of map cache pools for caching map data of different types, respectively, within a map cache in which the map data is cached. The memory controller may configure a timer in a first map cache pool among the plurality of map cache pools. The memory controller may write map data cached in the first map cache pool in the memory device based on the timer.

In another aspect, a memory controller is provided to include a memory interface configured to communicate with a memory device which is operable to store data, and a processor configured to communicate with the memory device through the memory interface and to control the memory device. The processor may configure a plurality of cache pools for caching map data of different types, respectively, within the map cache in which the map data is cached. The processor may configure a timer in a first map cache pool among the plurality of map cache pools. The processor may write map data cached in a first map cache pool based on the timer.

In another aspect, a method of operating a memory system is provided. The method of operating the memory system may include configuring a plurality of map cache pools for respectively caching map data of different types within the map cache provided to cache the map data. The method of operating the memory system may include configuring a timer in a first map cache pool among the plurality of map cache pools. The method of operating the memory system may include writing map data cached in the first map cache pool in the memory device based on the timer.

In some embodiments of the disclosed technology, it is possible to mitigate temporary deterioration of the performance of a read operation and a write operation, which is caused due to intensive flushing of map data in a memory device.

Further, in some embodiments of the disclosed technology, it is possible to satisfy QoS of a read operation and a write operation that are requested by a host.

BRIEF DESCRIPTION OF THE DRAWINGS

The above and other aspects, features and advantages of the disclosed technology will be more apparent from the following detailed description taken in conjunction with the accompanying drawings.

FIG. 8 illustrates an example of the write size per update according to the type of map data.

FIG. 9 illustrates an example of the configuration of a timer according to the type of map data described with reference to FIG. 8.

DETAILED DESCRIPTION

Hereinafter, embodiments of the disclosed technology will be described in detail with reference to the accompanying drawings.

Figure 1:
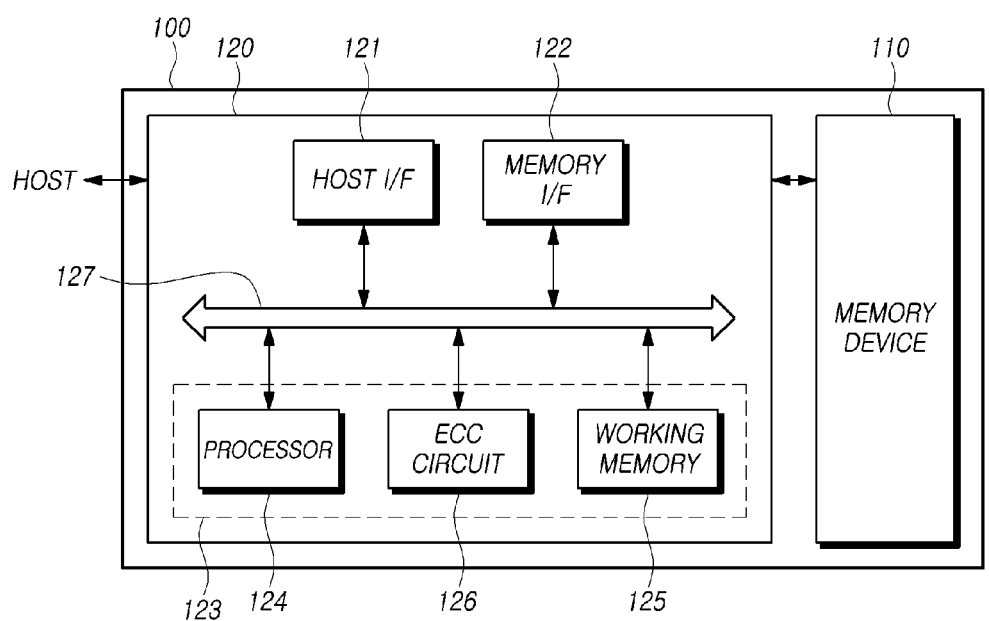
FIG. 1 is a schematic diagram illustrating a configuration of a memory system according to an embodiment of the disclosed technology.

FIG. 1 is a diagram illustrating the schematic configuration of a memory system 100 according to an embodiment of the disclosed technology.

Referring to FIG. 1, the memory system 100 may include a memory device 110 configured to store data, and a memory controller 120 configured to control the memory device 110.

The memory device 110 may include multiple memory blocks, each including a predetermined number of memory cells for storing data. The memory device 110 may be configured to operate in response to control signals received from the memory controller 120. Operations of the memory device 110 may include, for example, a read operation, a program operation (also referred to as a "write operation"), an erasure operation, and others.

The memory cells in the memory device 110 are used to store data and may be arranged in a memory cell. In some implementations where the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the disclosed technology are applicable to any type of flash memory devices having an electric charge storage layer. In an implementation, the electric charge storage layer may be formed of a conductive material, and such an electric charge storage layer can be called a floating gate. In another implementations, the electric charge storage layer may be formed of an insulating material, and such a flash memory device can be called a charge trap flash (CTF).

The memory device 110 may be configured to receive a command and an address from the memory controller 120 and to access an area of the memory cell array selected using the address. That is, the memory device 110 may perform an operation corresponding to the received command on a memory area in the memory device having a physical address corresponding to the received address from the memory controller 120.

In some implementations, the memory device 110 may perform, among others, a program operation, a read operation, and an erasure operation. During the program operation, the memory device 110 may write ("program") data to the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations to be performed on the memory device 110. The background operation may include operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of a request from the host, when it performs such a background operation of the memory device.

The memory controller 120 and the host may be separate devices. In some implementations, the memory controller 120 and the host may be integrated and implemented as a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to drive the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. Each piece of read data may include multiple sectors. As used herein, a "sector" may refer to a data unit that is smaller than the smallest unit for read operations (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable and the corresponding sector can be marked "pass".

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit 126 may provide information (e.g., address information) regarding the sectors deemed uncorrectable to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are illustrated in FIG. 1 by way of an example. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In some implementations, one or more other constituent elements may be added to the above-mentioned constituent elements of the memory controller 120.

Hereinafter, the memory device 110 will be described in more detail with reference to FIG. 2.

Figure 2:
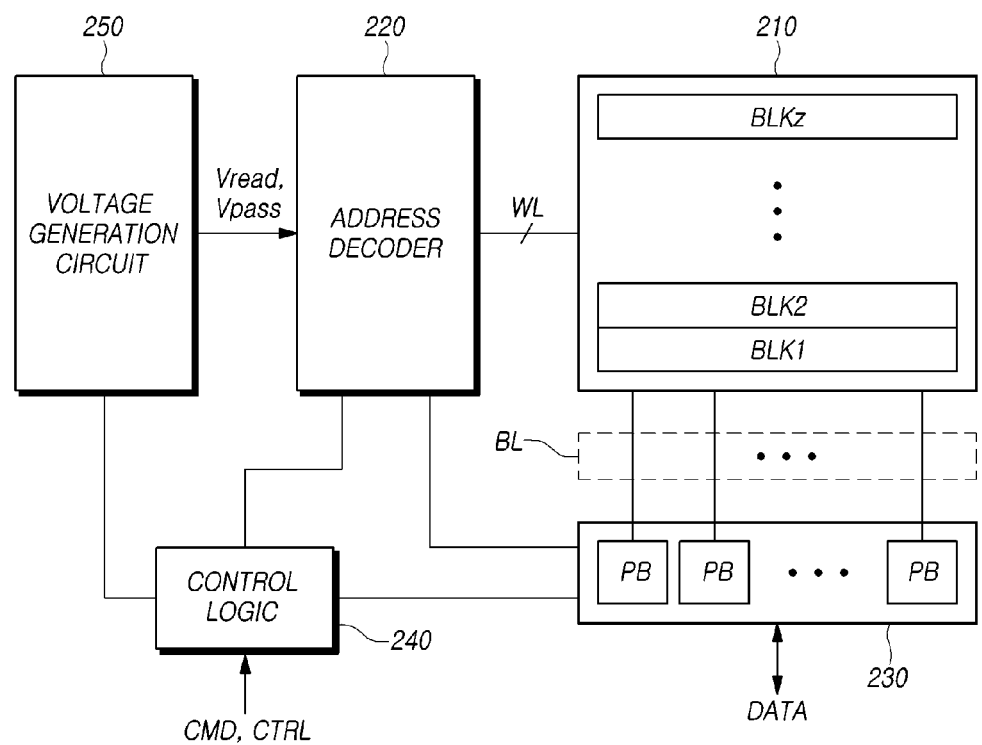
FIG. 2 is a block diagram schematically illustrating a memory device according to an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be configured as a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data per memory cell. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation on a page by page basis. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change in the amount of current that flows based on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may consist of multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining a memory cell array including multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erasure operation may be performed memory block by memory block basis.

Figure 3:
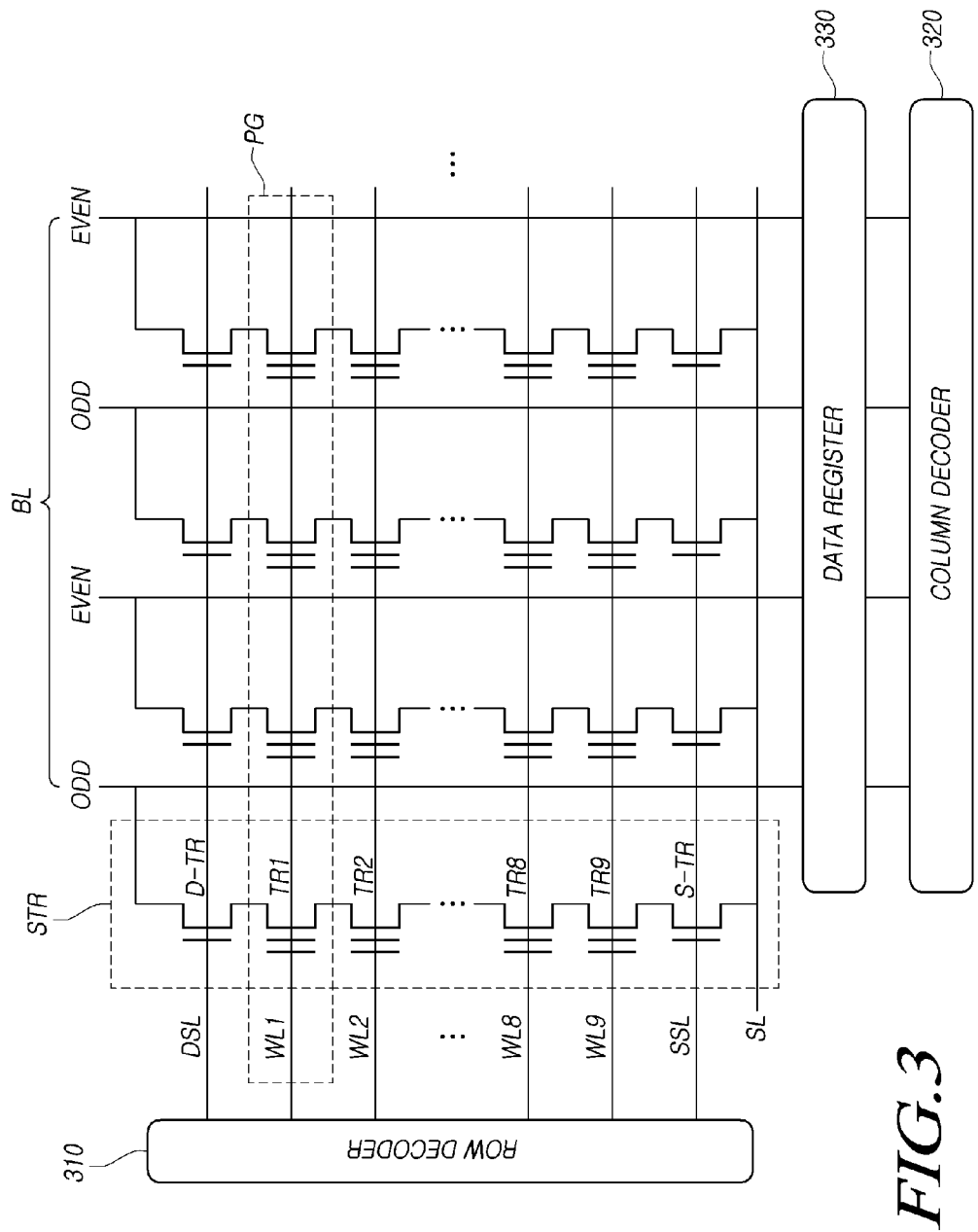
FIG. 3 is a diagram illustrating a structure of word lines and bit lines of a memory device according to an embodiment of the disclosed technology.

FIG. 3 is a diagram illustrating a structure of word lines WL and bit lines BL of a memory device 110 according to an embodiment of the disclosed technology.

Referring to FIG. 3, the memory device 110 has a core area in which memory cells MC are concentrated, and an auxiliary area which corresponds to the remaining area other than the core area. The auxiliary area includes circuitry for supporting operations of the memory cell array 210.

The core area may include pages PG and strings STR. In some implementations, multiple word lines WL1-WL9 and multiple bit lines BL are arranged to intersect.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line BL and even-numbered bit line B are coupled in common to a column decoder 320.

The address may be used to access one or more memory cells MC in the core area. The address can be provided through the input/output end to the row decoder 310 and the column decoder 320 to select a corresponding target memory cell. As used herein, "target memory cell" ca refer to one of the memory cells MC targeted to be accessed from the memory controller or the user for programming data therein or for reading programmed data therefrom, and in some implementations the memory cells MC may be located at intersections between the word lines WL1-WL9 connected to the row decoder 310 and the bit lines BL connected to the column decoder 320.

In some implementations, the data register 330 plays a role because all data processing by the memory device 110, including program and read operations, occurs via the data register 330. If data processing by the data register 330 is delayed, all of the other areas need to wait until the data register 330 finishes the data processing. In addition, degradation of performance of the data register 330 may degrade the overall performance of the memory device 110.

Referring to the example illustrated in FIG. 3, in one string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that selectively connects the corresponding string STR to the data register 330. The second selection transistor S-TR is used as a switch circuit that selectively connects the corresponding string STR to the source line SL. The first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a predetermined voltage (for example, +20V) to the substrate through a source line SL during an erasure operation. The memory system 100 applies a certain voltage to allow both the first selection transistor D-TR and the second selection transistor S-TR to float during an erasure operation, thereby generating an infinite resistance. As a result, the applied erasure voltage can remove electrical charges from the floating gate FG of the selected memory cell.

When the operation of flushing the map data in the memory device and a read operation or a write operation that is requested by a host are performed at the same time, the performance of the read operation or the write operation requested by the host may suffer, and thus QoS may not be satisfied. In recognition of the issues above, some implementations of the disclosed technology provide a memory system that can avoid large amount of map data from being intensively flushed in the memory device. Some implementations of the disclosed technology can improve the QoS for the operations requested from a host.

Figure 4:
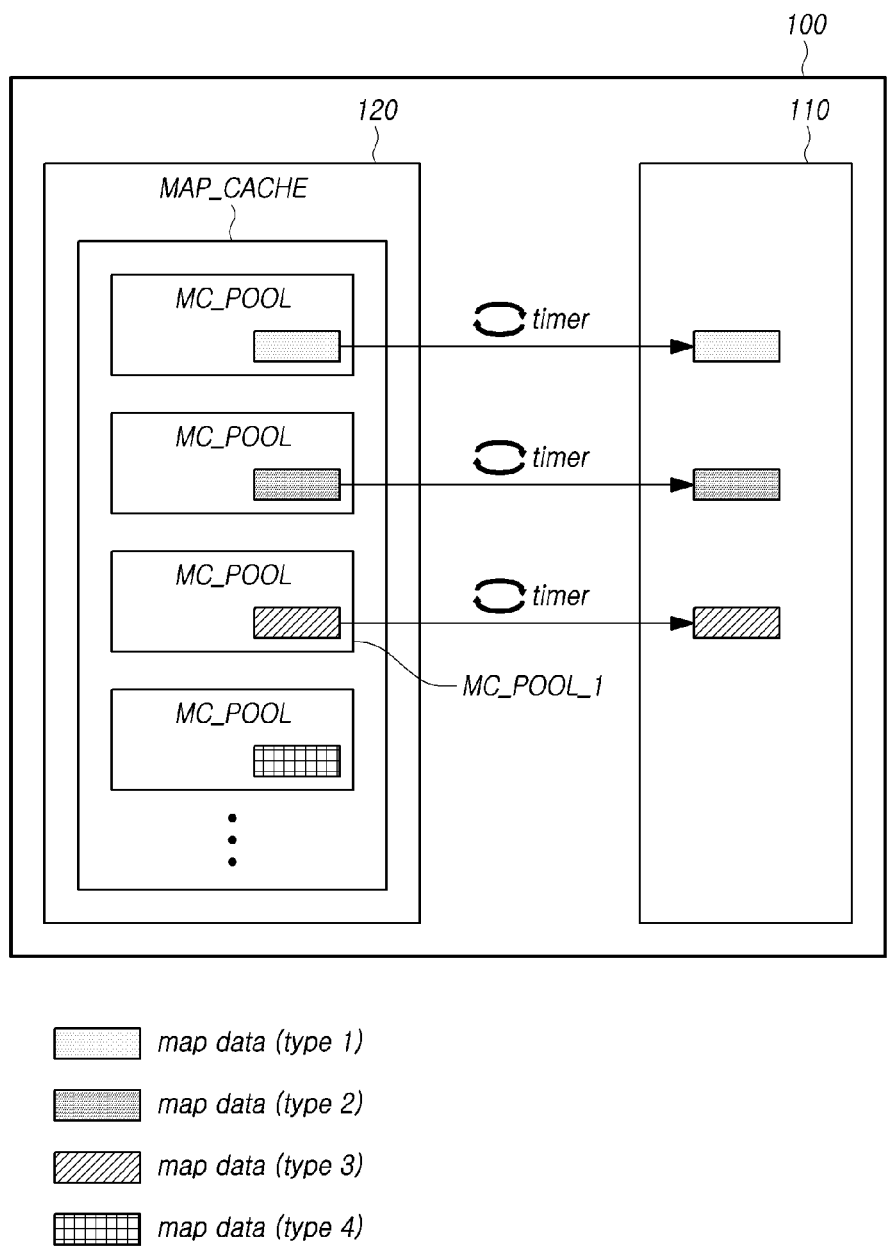
FIG. 4 is a block diagram schematically illustrating a memory system according to embodiments of the disclosed technology.

FIG. 4 is a block diagram schematically illustrating a memory system according to embodiments of the disclosed technology.

Referring to FIG. 4, a memory controller 120 of a memory system 100 may include a map cache (MAP_CACHE) in which map data is cached. When accessing map data, the memory controller 120 may identify whether the map data that the memory controller 120 desires to access is cached in the map cache (MAP_CACHE). When the map data is cached in the map cache (MAP_CACHE), the memory controller 120 may access the map data in the map cache (MAP_CACHE). When the map data is not cached in the map cache (MAP_CACHE), the memory controller 120 may read the map data from the memory device 110 and then cache the map data in the map cache (MAP_CACHE) from the memory device 110.

The map cache (MAP_CACHE) may be located inside or outside the memory controller 120. For example, the map cache (MAP_CACHE) may be located in the working memory 125 within the memory controller 120. In another example, the map cache (MAP_CACHE) may be located in a separate volatile memory device (e.g. SRAM, DRAM) outside the memory controller 120.

In some embodiments of the disclosed technology, the memory controller 120 may configure a plurality of map cache pools (MC_POOL) within the map cache (MAP_CACHE). At this time, each of the plurality of map cache pools (MC_POOL) may cache map data of different types. The plurality of map cache pools (MC_POOL) may be divided based on the type of cached map data.

In FIG. 4, the plurality of map cache pools (MC_POOL) may include a map cache pool for caching map data of type 1, a map cache pool for caching map data of type 2, a map cache pool for caching map data of type 3, and a map cache pool for caching map data of type 4. The types of the data will be further discussed with reference to FIG. 7 later in this patent document.

The memory controller 120 may configure a timer in at least one map cache pool among the plurality of map cache pools (MC_POOL).

At this time, the timer corresponding to the map cache pool may be used to determine the time point at which the map data cached in the corresponding map cache pool is flushed in the memory device 110. The flushing may correspond to writing the cached map data in the corresponding map cache pool in the memory device 110. In some implementations, the memory controller 120 may configure timers for all of the plurality of map cache pools (MC_POOL). In some other implementations, the memory controller 120 may configure a timer only a part of the plurality of map cache pools (MC_POOL). In the example of FIG. 4, the memory controller 120 configures timers for map cache pools for caching the map data of type 1, type 2, and type 3, but does not configure a timer for a map cache pool for caching the map data of type 4.

The map data cached in the map cache pool for which the timer is not configured may be flushed in the memory device 110 when a specific condition is satisfied (e.g. when the size of the cached map data is larger than or equal to a threshold value) instead of the condition of the timer expiring.

The memory controller 120 may flush map data cached in a first map cache pool (MC_POOL_1) among the plurality of map cache pools (MC_POOL) in the memory device 110 based on a timer corresponding to the first map cache pool (MC_POOL_1).

Figure 5:
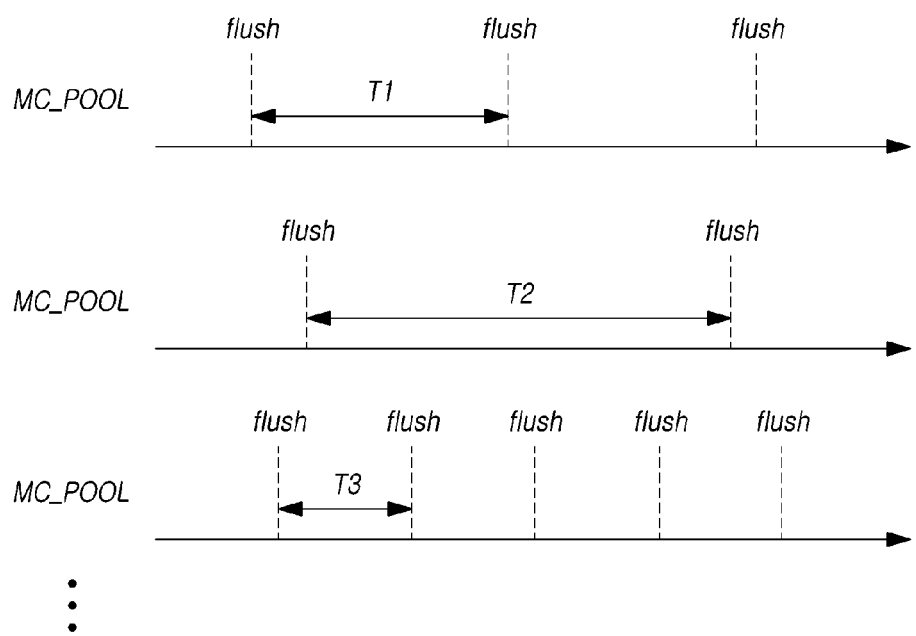
FIG. 5 illustrates an operation of a timer corresponding to each of a plurality of map cache pools according to embodiments of the disclosed technology.

FIG. 5 illustrates an operation of a timer corresponding to each of the plurality of map cache pools (MC_POOL) based on embodiments of the disclosed technology.

Referring to FIG. 5, the memory controller 120 may configure respective timers corresponding to the plurality of map cache pools (MC_POOL). The timers can be configured differently, by, for example, using different time intervals set, in the respective map cache pools.

For example, the memory controller 120 may configure a timer for one map cache pool such that the map data cached in the corresponding map cache pool is flushed in the memory device 110 at a time interval T1.

The memory controller 120 may configure a timer for another map cache pool such that the map data cached in the corresponding map cache pool is flushed in the memory device 110 at a time interval T2 different from T1.

The memory controller 120 may configure a timer for yet another map cache pool such that the map data cached in the corresponding map cache pool is flushed in the memory device 110 at a time interval T3 different from T1 and T2.

By configuring the timers differently in the map cache pools (MC_POOL), the memory controller 120 can distribute the time points at which the corresponding map data cached in the map cache (MAP_CACHE) is flushed in the memory device 110.

Accordingly, the memory controller 120 may prevent a problem occurring due to intensive flushing of the map data cached in the map cache (MAP_CACHE) in the memory device 110.

In general, the read request and the write request from the host are constantly input into the memory controller 120. When the memory controller 120 uses a large amount of resources (e.g. space in working memory 125) to flush the map data cached in the map cache (MAP_CACHE) in the memory device 110, the processing performance decreases due to the lack of resources available to process the read request or the write request that is received from the host, and thus QoS for the read operation and the write operation that are requested by the host may not be satisfied.

Accordingly, in order to avoid this problem, the memory controller 120 may distribute the time point at which the map data cached in the map cache (MAP_CACHE) is flushed in the memory device 110 through the timer so as to prevent large amounts of map data from being intensively flushed in the memory device. Therefore, the memory system 100 may mitigate deterioration of the performance of the read operation and the write operation occurring due to intensive flushing of the map data in the memory device, thereby satisfying QoS for the read operation and the write operation requested by the host.

The reason why the map data is distributed to and flushed in each map cache pool by configuring a plurality of map cache pools (MC_POOL) within the map cache (MAP_CACHE) has been described above.

Hereinafter, an example of a method of configuring the plurality of map cache pools (MC_POOL) within the map cache (MAP_CACHE) will be described with reference to FIG. 6.

Figure 6:
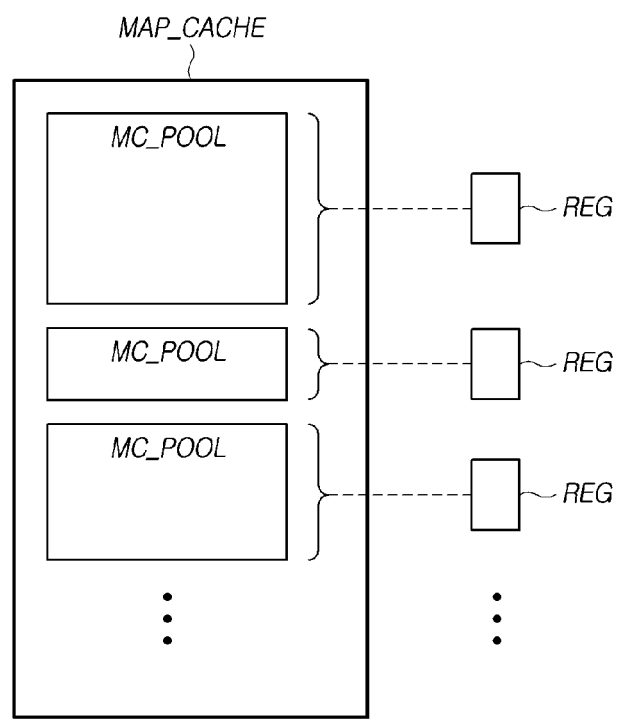
FIG. 6 illustrates an example of a method by which a memory system configures an area of each map cache pool according to embodiments of the disclosed technology.

FIG. 6 illustrates an example of a method by which the memory system 100 configures an area of each map cache pool according to embodiments of the disclosed technology.

Referring to FIG. 6, the memory controller 120 of the memory system 100 may configure values of registers (REG) indicating areas of the plurality of map cache pools (MC_POOL) in order to configure the plurality of map cache pools (MC_POOL) within the map cache (MAP_CACHE).

Here, the method of configuring values stored in the registers (REG) may be determined in various ways. For example, each register (REG) may store values of a start address and an end address of the corresponding map cache pool. In another example, each register (REG) may store values of a start address and a size of the corresponding map cache pool.

Hereinafter, a detailed embodiment in which the memory controller 120 configures a timer corresponding to each of the plurality of map cache pools (MC_POOL) is described.

For example, the memory controller 120 may differently configure a timer corresponding to each of the plurality of map cache pools (MC_POOL) according to the type of map data cached in each map cache pool. That is, for a first map cache pool (MC_POOL_1) among the plurality of map cache pools (MC_POOL), the memory controller 120 may configure a timer corresponding to the first map cache pool (MC_POOL_1) according to the type of map data cached in the first map cache pool (MC_POOL_1).

In embodiments of the disclosed technology, for example, the types of map data may be divided as follows.

1. L2V Data Type

Map data of the L2V data type is data indicating a mapping relationship between a Logical Address (LA) for transmission from the host and a virtual physical address (Virtual Address (VA)) of the memory device 100. The virtual physical address corresponds to a physical address of a virtual flash memory, which may be associated with a physical address of the memory device 110 through a virtual flash layer.

2. VPT Data Type

Map data of the VPT data type is data indicating whether a page located in an address indicated by the map data is a valid page.

3. Journaling Data Type

Map data of the journaling data type is data indicating a change in the map data, and may be used to track a change history of the map data.

4. Other Data Types

Map data of other data types is data indicating the remaining information (e.g. a read count or erase count for each memory block), other than the L2V data, the VPT data, and the journaling data.

Figure 7:
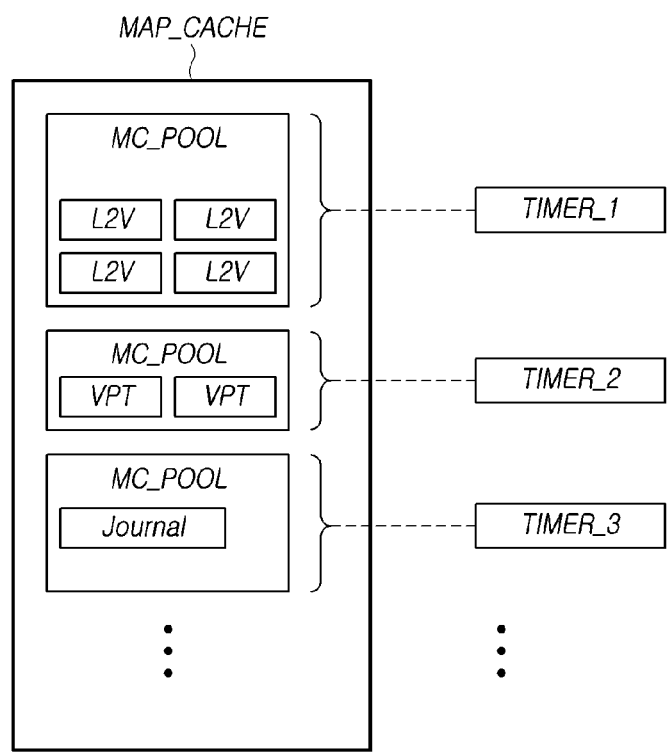
FIG. 7 illustrates an example of types of map data cached in respective map cache pools according to embodiments of the disclosed technology.

FIG. 7 illustrates an example of types of map data cached in respective map cache pools according to embodiments of the disclosed technology.

The plurality of map cache pools (MC_POOL) included in the map cache (MAP_CACHE) may cache map data of different types. In FIG. 7, the plurality of map cache pools (MC_POOL) may cache map data of the L2V data type, the VPT data type, and the journaling data type, respectively.

The memory controller 120 may configure a first timer (TIMER_1) for the map cache pool for caching the map data of the L2V data type, among the plurality of map cache pools (MC_POOL).

The memory controller 120 may configure a second timer (TIMER_2) for the map cache pool for caching the map data of the VPT data type among the plurality of map cache pools (MC_POOL).

The memory controller 120 may configure a third timer (TIMER_3) for the map cache pool for caching the map data of the journaling data type among the plurality of map cache pools (MC_POOL).

It has been described above that the memory controller 120 configures the timer according to the type of map data cached in the map cache pool.

Hereinafter, detailed embodiments in which the memory controller 120 configures a timer value according to the type of map data cached in the map cache pool will be described.

For example, the memory controller 120 may configure a timer corresponding to the first map cache pool (MC_POOL_1), among the plurality of map cache pools (MC_POOL), based on at least one of the size of a cache line for the first map cache pool (MC_POOL_1), the number of stripes for map data cached in the first map cache pool (MC_POOL_1), and a configured target performance value. Hereinafter, this will be described in detail with reference to FIGS. 8 to 9.

FIG. 8 illustrates an example of the write size per update according to the type of map data.

Referring to FIG. 8, among the map data, L2V data has a size of 4 B, VPT data has a size of 4 B, and the journaling data has a size of 12 B.

When the L2V data is updated, the memory controller 120 reads one piece of L2V data, and for one piece of the read L2V data, updates mapping information between a logical address and a virtual physical address stored in the corresponding L2V data and then writes the L2V data. Accordingly, when L2V data is updated, the number of writes of the L2V data is one. When L2V data is updated, the total size of the written L2V data is (4 B*1)=4 B.

When VPT data is updated, valid data is written on a new page, and a page storing data of a previous version of the corresponding data is not valid anymore. Accordingly, the memory controller 120 updates one piece of VPT data, previously indicating a valid page to indicate an invalid page, and updates another piece of VPT data to indicate a new valid page. When VPT data is updated, the number of writes of the VPT data is two. Therefore, when the VPT data is updated, the total size of the written VPT data is (4 B*2)=8 B.

When journaling data is updated, one piece of new journaling data indicating change information is written, and there is no change in the conventional journaling data, and thus the number of writes of journaling data is one. Therefore, when journaling data is updated, the total size of the written journaling data is (12 B*1)=12 B.

FIG. 9 illustrates an example of the configuration of a timer according to the type of map data described with reference to FIG. 8.

As described above, when data is updated, the size of written L2V data is 4 B, the size of written VPT data is 8 B, and the size of written journaling data is 12 B.

The size of a cache line on which map data is cached in the map cache pool may be different according to each map cache pool. In FIG. 9, it is assumed that the size of a cache line of the map cache pool in which L2V data is cached is 64 B, the size of a cache line of the map cache pool in which VPT data is cached is 64 B, and the size of a cache line of the map cache pool in which journaling data is cached is 128 B.

In this case, when the L2V data is updated, a cache line of 4 B among 64 B is updated per update, and thus a dirty rate, which is a rate at which the cache line enters a dirty state per update, is 4 B/64 B=1/16.

Further, when the VPT data is updated, a cache line of 8 B among 64 B is updated per update, and thus a dirty rate is 8 B/64 B=1/8.

When the journaling data is updated, a cache line of 12 B among 128 B is updated per update, and thus a dirty rate is 12 B/128 B=3/32.

At this time, it is assumed that the number of stripes for map data is 64 and the target performance is 1 M IOPS (input/output operations per second). 64 stripes for map data mean that FTL stripes and processes the unit of one piece of map data to be 64. In this case, in order to satisfy 1 M IOPS, 64 pieces of striped map data should be written every 1 μs (=(1/1 M)s).

Since the dirty rate of L2V data is 1/16, the number of cache lines in the dirty state is 64/16=4 when 64 pieces of striped map data are updated. Accordingly, 4 cache lines should be flushed every 1 μs, and thus a timer value is configured as 1/4 μs.

Since the dirty rate of VPT data is 1/8, the number of cache lines in the dirty state is 64/8=8 when 64 pieces of striped map data are updated. Accordingly, 8 cache lines should be flushed every 1 μs, and thus a timer value is configured as 1/8 μs.

Since the dirty rate of journaling data is 3/32, the number of cache lines in the dirty state is 64/(32/3)=6 when 64 pieces of map data are updated. Accordingly, 6 cache lines should be flushed every 1 μs, and thus a timer value is configured as 1/6 μs.

The method of configuring the timer in each map cache pool has been described.

Hereinafter, the time point at which a timer configured in each map cache pool is stopped is described.

Figure 10:
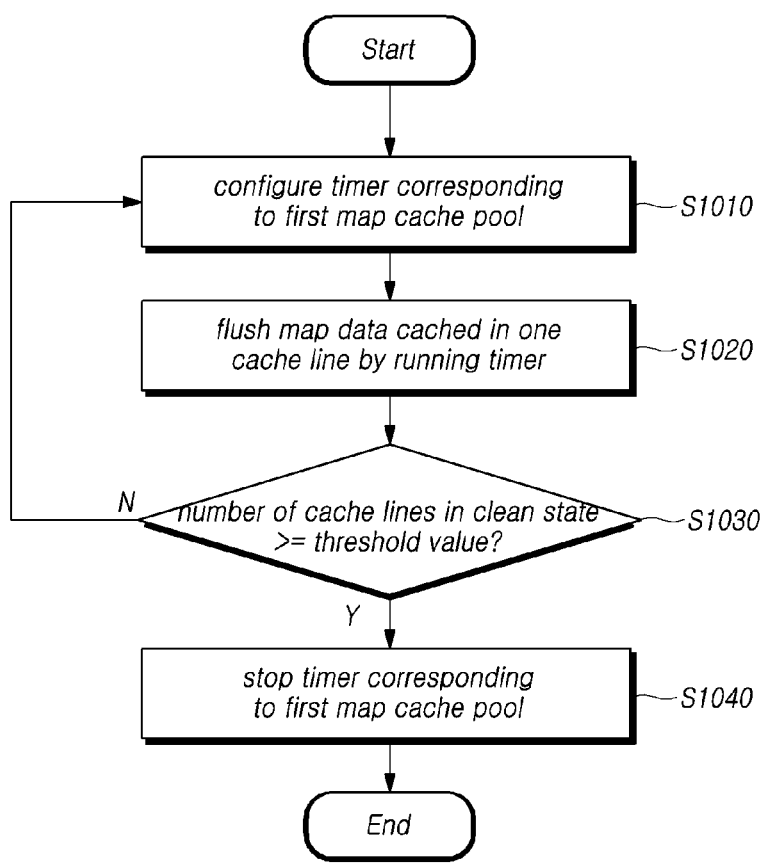
FIG. 10 is a flowchart illustrating an example of an operation in which a memory system determines whether to stop a timer according to embodiments of the disclosed technology.

FIG. 10 is a flowchart illustrating an example of an operation in which the memory system 100 determines whether to stop a timer based on embodiments of the disclosed technology.

Referring to FIG. 10, the memory controller 120 of the memory system 100 may configure a timer corresponding to a first map cache pool (MC_POOL_1) among a plurality of map cache pools (MC_POOL) in S1010.

In S1020, the memory controller 120 may flush map data cached on one cache line among a plurality of cache lines included in the first map cache pool (MC_POOL_1) in the memory device 110 by running the timer configured in step S1010.

The memory controller 120 may determine whether the number of cache lines in a clean state among the plurality of cache lines included in the first map cache pool (MC_POOL_1) is larger than or equal to a preset threshold value in S1030. The clean state corresponds to a state of the cache line that any change in map data cached in the corresponding cache line is stored in the memory device 110.

When the number of cache lines in the clean state is larger than or equal to the preset threshold value (S1030-Y), the memory controller 120 may stop the timer corresponding to the first map cache pool (MC_POOL_1) in S1040. This is because there is no need to flush the map data cached in the first map cache pool (MC_POOL_1) in the memory device 110 since the first map cache pool (MC_POOL_1) has enough extra space to store additional cache map data.

When the number of cache lines in the clean state is smaller than the preset threshold value (S1030-N), the memory controller 120 may perform step S1010 again and reconfigure the timer corresponding to the first map cache pool (MC_POOL_1) in order to additionally flush map data cached in the first map cache pool (MC_POOL_1).

The case in which there is no restriction on the time point at which the memory controller 120 runs the timer for the first map cache pool (MC_POOL_1) has been described.

Hereinafter, the case in which the memory controller 120 runs the timer for the first map cache pool (MC_POOL_1) only at a time point at which a specific condition is satisfied will be described.

Figure 11:
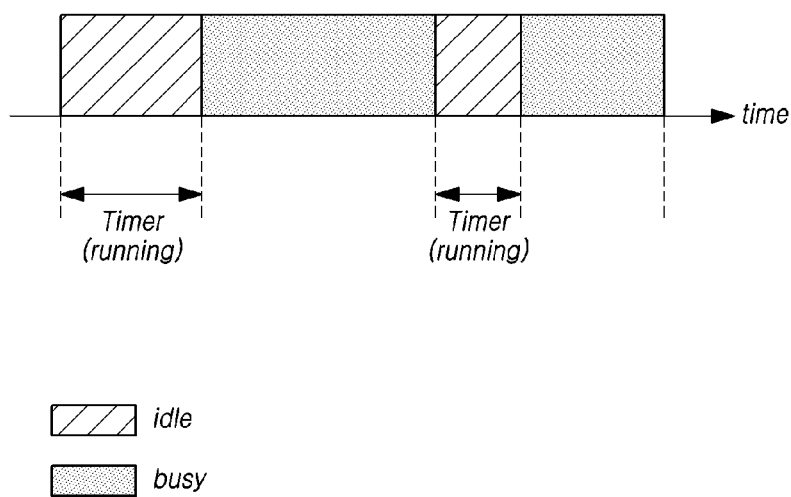
FIG. 11 illustrates an example of the time point at which a memory system runs a timer according to embodiments of the disclosed technology.

FIG. 11 illustrates an example of the time point at which the memory system 100 runs a timer according to embodiments of the disclosed technology.

Referring to FIG. 11, the memory controller 120 of the memory system 100 may run a timer corresponding to a first map cache pool in an idle state. The idle state may correspond to the state in which the memory system 100 does not process any request corresponding to a command received from the host or the memory system 100 does not process a background operation (e.g. garbage collection or read reclaim).

The memory controller 120 may run the timer corresponding to the first map cache pool (MC_POOL_1) only in the idle state, and may flush map data cached in the first map cache pool (MC_POOL_1) in the memory device 110 according to the timer.

When the memory controller 120 is in a busy state, in which a read operation or write operation requested by the host or a background operation (e.g. garbage collection or read reclaim) is processed, the memory controller 120 does not run the timer corresponding to the first map cache pool (MC_POOL_1) in order to prevent performance deterioration generated due to flushing of the map data in the memory device 110.

Figure 12:
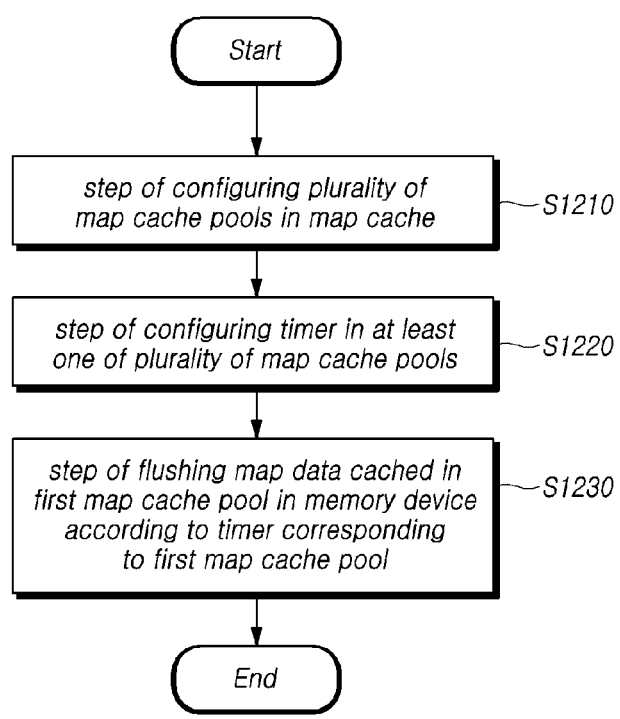
FIG. 12 illustrates a method of operating a memory system according to embodiments of the disclosed technology.

FIG. 12 illustrates a method of operating the memory system 100 based on embodiments of the disclosed technology.

Referring to FIG. 12, the method of operating the memory system 100 may include step S1210 of configuring a plurality of map cache pools (MC_POOL) for caching map data of different types within a map cache (MAP_CACHE) in which map data is cached.

The method of operating the memory system 100 may include step S1220 of configuring a timer in at least one map cache pool among the plurality of map cache pools (MC_POOL) configured in step S1210.

The method of operating the memory system 100 may include step S1230 of flushing map data cached in the first map cache pool (MC_POOL_1) among the plurality of map cache pools (MC_POOL) in the memory device 110 according to a timer corresponding to the first map cache pool (MC_POOL_1).

The timer corresponding to the first map cache pool (MC_POOL_1) may be configured according to the type of map data cached in the first map cache pool (MC_POOL_1).

For example, the timer corresponding to the first map cache pool (MC_POOL_1) may be configured on the basis of the size of a cache line for the first map cache pool, the number of stripes of map data cached in the first map cache pool (MC_POOL_1), and the configured target performance.

Meanwhile, the operation of the memory controller 120 described above may be controlled by the control circuit 123, and the processor 124 may execute (drive) firmware in which the general operation of the memory controller 120 is programmed.

Figure 13:
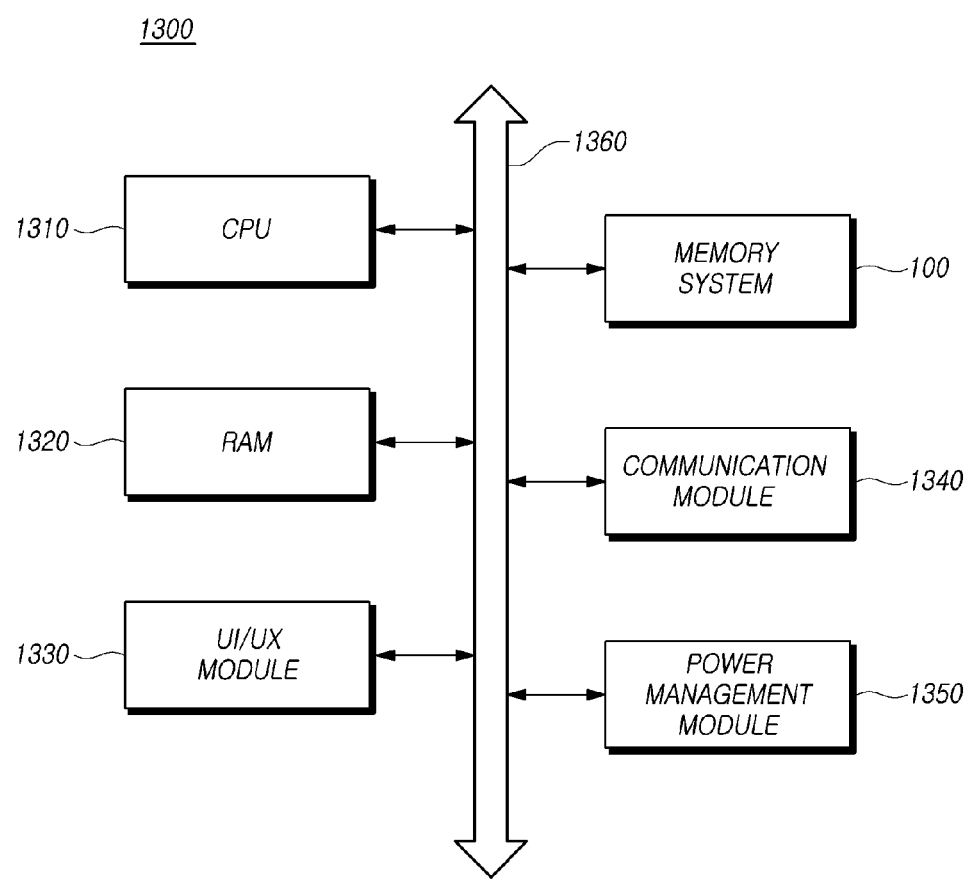
FIG. 13 is a diagram illustrating the configuration of a computing system according to embodiments of the disclosed technology.

FIG. 13 is a diagram illustrating the configuration of a computing system 1300 based on an embodiment of the disclosed technology.

Referring to FIG. 13, the computing system 1300 based on an embodiment of the disclosed technology may include: a memory system 100 electrically connected to a system bus 1360; a CPU 1310 configured to control the overall operation of the computing system 1300; a RAM 1320 configured to store data and information related to operations of the computing system 1300; a user interface/user experience (UI/UX) module 1330 configured to provide the user with a user environment; a communication module 1340 configured to communicate with an external device as a wired and/or wireless type; and a power management module 1350 configured to manage power used by the computing system 1300.

The computing system 1300 may be a personal computer (PC) or may include a mobile terminal such as a smartphone, a tablet or various electronic devices.

The computing system 1300 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be reduced or minimized. In addition, according to an embodiment of the disclosed technology, an overhead occurring in the process of calling a specific function may be minimized. Although various embodiments of the disclosed technology have been described for illustrative purposes, those skilled in the art will appreciate that various modifications, additions and substitutions are possible based on what is described and illustrated in this patent document.

What is claimed is:

1. A memory system comprising:
a memory device operable to store data; and
a memory controller in communication with the memory device and configured to control the memory device by performing operations that include,
configuring a plurality of map cache pools for caching map data of different types, respectively, within a map cache in which the map data is cached,
configuring a timer in a first map cache pool among the plurality of map cache pools, and
writing map data cached in the first map cache pool in the memory device based on the timer.

2. The memory system of claim 1, wherein the memory controller is further configured to configure registers indicating areas of the plurality of map cache pools within the map cache.

3. The memory system of claim 1, wherein the memory controller is further configured to configure the timer based on a type of map data cached in the first map cache pool.

4. The memory system of claim 1, wherein the different types include an L2V data type indicating a mapping relationship between a logical address and a virtual address, a VPT data type indicating a validity of an area indicated by the map data, or a journaling data type indicating a change in the map data.

5. The memory system of claim 1, wherein the memory controller is further configured to configure the timer corresponding to the first map cache pool based on at least one of a size of a cache line for the first map cache pool, a number of stripes of map data cached in the first map cache pool, or a target performance.

6. The memory system of claim 5, wherein the memory controller is configured to stop the timer corresponding to the first map cache pool upon detecting that a number of cache lines included in the first map cache pool and in a state that corresponding map data is stored in the memory device is larger than or equal to a preset threshold value.

7. The memory system of claim 1, wherein the memory controller is configured to run the timer corresponding to the first map cache pool when the memory controller is in an idle state.

8. A memory controller comprising:
a memory interface configured to communicate with a memory device which is operable to store data; and
a processor configured to communicate with the memory device through the memory interface and to control the memory device,
wherein the processor is further configured to 1) configure a plurality of map cache pools for caching map data of different types, respectively, within a map cache in which the map data is cached, 2) configure a timer in a first map cache pool among the plurality of map cache pools, and 3) write map data cached in a first map cache pool based on the timer.

9. The memory controller of claim 8, wherein the processor is further configured to configure registers indicating areas of the plurality of map cache pools within the map cache.

10. The memory controller of claim 8, wherein the processor is further configured to configure the timer based on a type of map data cached in the first map cache pool.

11. The memory controller of claim 10, wherein the different types include an L2V data type indicating a mapping relationship between a logical address and a virtual address, a VPT data type indicating a validity of an area indicated by the map data, or a journaling data type indicating a change in the map data.

12. The memory controller of claim 10, wherein the processor is further configured to configure the timer corresponding to the first map cache pool based on at least one of a size of a cache line for the first map cache pool, a number of stripes of map data cached in the first map cache pool, or a target performance.

13. The memory controller of claim 12, wherein the processor is further configured to stop the timer corresponding to the first map cache pool when a number of cache lines included in the first map cache pool and in a state that corresponding map data is stored in the memory device is larger than or equal to a preset threshold value.

14. The memory controller of claim 8, wherein the processor is configured to run the timer corresponding to the first map cache pool when the processor is in an idle state.

15. A method of operating a memory system, the method comprising:
configuring a plurality of map cache pools for respectively caching map data of different types within a map cache provided to cache the map data;
configuring a timer in a first map cache pool among the plurality of map cache pools; and
writing map data cached in the first map cache pool in the memory device based on the timer.

16. The method of claim 15, wherein the timer corresponding to the first map cache pool is configured based on a type of map data cached in the first map cache pool.

17. The method of claim 16, wherein the timer corresponding to the first map cache pool is configured based on at least one of a size of a cache line for the first map cache pool, a number of stripes of map data cached in the first map cache pool, and a target performance.

18. The method of claim 15, further comprising:
configuring a timer in a second map cache pool among the plurality of map cache pools; and
flushing map data cached in the second map cache pool in the memory device based on the timer in the second map cache pool.

19. The method of claim 18, wherein the timer in the second map cache pool has a time interval set that is different from the timer in the second map cache.

* * * * *